United States Patent

Hanzawa et al.

[11] Patent Number: 5,142,409
[45] Date of Patent: Aug. 25, 1992

[54] OBJECTIVE LENS SYSTEM

[75] Inventors: Toyoharu Hanzawa; Yoshiharu Saito, both of Tokyo, Japan

[73] Assignee: Olympus Optical Co., Ltd., Tokyo, Japan

[21] Appl. No.: 698,783

[22] Filed: May 13, 1991

[30] Foreign Application Priority Data

May 15, 1990 [JP] Japan .................................. 2-122935

[51] Int. Cl.$^5$ .......................... G02B 13/14; G02B 1/00
[52] U.S. Cl. ...................................... 359/355; 359/656
[58] Field of Search ............... 359/350, 355, 656, 793

[56] References Cited

U.S. PATENT DOCUMENTS

| | | | |
|---|---|---|---|
| 4,200,352 | 4/1980 | Yuta | 359/355 |
| 4,201,440 | 5/1980 | Yuta | 359/355 |
| 4,770,477 | 9/1988 | Shafer | 359/355 |
| 4,891,663 | 1/1990 | Hirose | 359/355 |
| 4,934,801 | 6/1990 | Mercado | 359/355 |
| 5,031,977 | 7/1991 | Gibson | 359/355 |

Primary Examiner—Bruce Y. Arnold
Assistant Examiner—Martin Lerner
Attorney, Agent, or Firm—Cushman, Darby & Cushman

[57] ABSTRACT

An objective lens system for the rays within the ultraviolet region comprising, in the order from the object side, a first lens unit which has a positive refractive power, and comprises a meniscus lens component having a strongly concave surface on the object side and at least two cemented lens components, and a second lens unit which has a positive refractive power and comprises at least two cemented lens components, all the lens elements composing said objective lens system being made of optical materials having, when they are 5 mm thick, internal transmittance of at least 50% for a ray having a wavelength of 300 nm.

5 Claims, 4 Drawing Sheets

OBJECTIVE LENS SYSTEM

BACKGROUND OF THE INVENTION a) Field of the Invention

The present invention relates to an objective lens system which is to be used with rays having wavelengths in the vicinity of 250 nm within the near ultraviolet region.

b) Description of the Prior Art

The objective lens systems designed for the rays having wavelengths in the vicinity of 250 nm in the near ultraviolet region are used as high resolution imaging lens systems, objective lens systems for studying living organisms with the rays within the ultraviolet region, and objective lens systems for researches and application of laser lights. Though some of these objective lens systems to be used for the above-mentioned purposes of application are designed as reflecting type, refracting type of objective systems are more advantageous for researches of living organism and laser lights in the ultraviolet region which require high resolution.

An objective lens of the refractive type designed for use with the rays in the ultraviolet region is described on page 689, JOSA, Vol 38. This objective lens system is of the glycerin oil immersion type, and has a high magnification, a large numerical aperture and favorably corrected spherical aberration.

Further, each of the objective lens systems for the ultraviolet rays disclosed by Japanese Patent Kokai Publication No. Hei 1-319719 and Kokai Publication No. Hei 1-319720 has a low magnification and a small numerical aperture, but comprises a small number of lens elements and has spherical aberration corrected relatively favorably.

The objective lens system described in the above-mentioned JOSA has remarkable curvature of field and a very narrow effective visual field, and is of the glycerin oil immersion type which cannot be used for researches of semiconductors or application of laser lights.

In the objective lens systems disclosed by Japanese Patents Kokai Publication No. Hei 1-319719 and Kokai Publication No. Hei 1-319720 which comprise the small numbers of lens elements, chromatic aberration and curvature of field are not corrected sufficiently in spite of the low magnifications and low numerical aperture thereof.

SUMMARY OF THE INVENTION

A primary object of the present invention is to provide an objective lens system of the refracting type which has a high resolution, chromatic aberration corrected favorably at wavelengths in the vicinity of 250 nm and allow optical performance thereof to be scarcely degraded even at the marginal portion of the visual field.

The objective lens system according to the present invention comprises, in the order from the object side, a first lens unit which has a positive refractive power, and comprises a meniscus lens component having a strongly concave surface on the object side and at least two cemented lens components, and a second lens unit which has a positive refractive power and comprises at least one lens component. Said objective lens system is characterized in that it is fabricated only from optical materials having transmittance of at least 50%, at thickness of 5 mm, for a ray having a wavelength of 300 nm.

An optical system which is to be used only with the rays at the wavelengths in the vicinity of 250 nm, like the objective lens system according to the present invention, must be made of materials exhibiting high transmittance for the rays. These materials are ordinarily limited to calcium fluoride ($CaF_2$), lithium fluoride (LiF), molten or synthetic quartz, etc.

All of these materials have refractive indices within a range of 1.42 to 1.51 for the rays within the above-mentioned region and dispersing powers which are not distributed within a broad range. When an objective lens system is to be composed only of lens elements fabricated from the above-mentioned materials, it is therefore difficult to design the lens system so as to have a numerical aperture nearly equal to that of an ordinary objective lens system for the visible rays and aberrations corrected favorably even at marginal portion of a wide visual field.

The present invention has succeeded, by selecting the composition described above, in overcoming the above-mentioned difficulty or obtaining an objective lens system which has a low magnification and aberrations corrected even at the marginal portion of the visual field for rays within a wavelength range of several tens of nanometers.

The objective lens system according to the present invention adopts, as the first lens component arranged in the first lens unit, the meniscus lens component having the strongly concave surface on the object side as described above, which functions to correct the spherical aberration and maintaining the flatness of the image surface.

Further, the first lens unit comprises at least two cemented lens components, which function to correct longitudinal chromatic aberration and lateral chromatic aberration. Further, the lateral chromatic aberration can be corrected more favorably by designing the above-mentioned first lens component as a cemented doublet. Furthermore, it is desirable for correcting spherical aberration to select, as optical materials for the lens elements, calcium fluoride or lithium fluoride for the positive lens elements to be used in the at least two cemented lens components to be arranged in the first lens unit, and quartz materials for the negative lens elements to be used in the cemented lens components.

When the objective lens system according to the present invention is to have a magnification on the order of 10× or 20×, it is desirable for correction of aberrations to design the lens system so as to satisfy the following condition (1):

$$0.7 < f_I/f < 1.5 \tag{1}$$

wherein the reference symbol f represents the focal length of the objective lens system as a whole and the reference symbol $f_I$ designates the focal length of the first lens unit.

If the lower limit of the condition (1) is exceeded, the positive refractive power of the first lens unit will be strengthened, thereby making it difficult to correct the spherical aberration. If the upper limit of the condition (1) is exceeded, in contrast, coma will be aggravated.

The second lens unit of the objective lens system according to the present invention comprises at least two lens elements and has a positive refractive power as a whole. The second lens unit is required for correcting especially the offaxial aberrations (coma, astigmatism and curvature of field). Considering balance between the powers of the first lens unit and the second lens unit, it is desirable for correction of the aberrations to select focal lengths of these two lens unit so as to satisfy the following condition (2):

$$1.5 < f_{II}/f_I < 5.0 \quad (2)$$

wherein the reference symbol $f_{II}$ represents the focal length of the second lens unit.

If the lower limit of the condition (2) is exceeded, it will be difficult to correct coma. If the upper limit of the condition (2) is exceeded, astigmatism and curvature of field will undesirably be aggravated.

Further, it is desirable for correction of aberrations to select a radius of curvature $r_1$ for the object side concave surface of the first lens component to be arranged in the first lens unit so as to satisfy the condition (3) shown below:

$$0.15 < |r_1|/f < 0.45 \quad (3)$$

If the lower limit of the condition (3) is exceeded, it will be difficult to correct coma and aspherical aberration. If the upper limit of the condition (3) is exceeded, Petzval's sum will be increased and flatness of image surface will be degraded.

Furthermore, it is desirable for favorable correction of aberrations to reserve an airspace between the first lens unit and the second lens unit which satisfies the following condition (4):

$$0.5 < D/f \quad (4)$$

the lower limit of the condition (4) is exceeded, rays will be incident of the second lens units at lower heights, thereby making it difficult to correct curvature of field and coma.

Since the objective lens system according to the present invention described above is used at short wavelengths in the vicinity of 250 nm, it exhibits resolution higher than twice that of an ordinary objective lens system which is used with the visible rays though the numerical aperture is the same between the two objective lens systems. Further, the objective lens system according to the present invention is usable as an objective lens system for ultraviolet rays which has a higher resolution, a higher magnification and a larger numerical aperture. Furthermore, the objective lens system according to the present invention may be used in various fields of application such as researches, inspections and measurements of super LSI's as well as researches of chromosomes and biological organs.

In addition, as light sources which emit rays having wavelengths in the vicinity of 250 nm, there are available excimer laser, KrF (249 nm), twofold harmonic of argon laser (257 nm) and fourfold harmonic of YAG laser (266 nm). The objective lens system according to the present invention is applicable also to researches of laser lights emitted from these light sources. In addition, usable as general light sources for the objective lens system according to the present invention are the super high-pressure mercury lamp (254 nm), xenon lamp and so on.

DETAILED DESCRIPTION OF THE PREFERRED EMBODIMENTS

Figure 1:
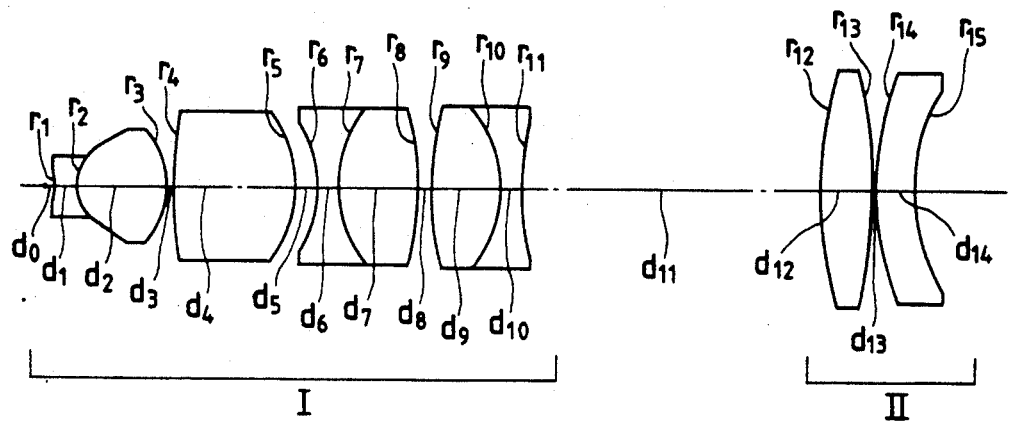
FIG. 1 through FIG. 4 show sectional views illustrating compositions of Embodiments 1 through 4 respectively of the objective lens system according to the present invention.

Now, the objective lens system according to the present invention will be described more detailedly below with reference to the preferred embodiments illustrated in the accompanying drawings and given in the form of the following numerical data:

| Embodiment 1 |
|---|
| $f = 1, \quad \beta = -20, \quad NA = 0.4$ |

| | | |
|---|---|---|
| | $d_0 = 0.044$ | |
| $r_1 = -0.223$ | | |
| | $d_1 = 0.088$ | quartz |
| $r_2 = 0.175$ | | |
| | $d_2 = 0.376$ | CaF$_2$ |
| $r_3 = -0.324$ | | |
| | $d_3 = 0.022$ | |
| $r_4 = 1.623$ | | |
| | $d_4 = 0.496$ | CaF$_2$ |
| $r_5 = -0.477$ | | |
| | $d_5 = 0.087$ | |
| $r_6 = -0.491$ | | |
| | $d_6 = 0.088$ | quartz |
| $r_7 = 0.513$ | | |
| | $d_7 = 0.333$ | CaF$_2$ |
| $r_8 = -1.068$ | | |
| | $d_8 = 0.047$ | |
| $r_9 = 1.232$ | | |
| | $d_9 = 0.29$ | CaF$_2$ |
| $r_{10} = -0.511$ | | |
| | $d_{10} = 0.088$ | quartz |
| $r_{11} = 1.143$ | | |
| | $d_{11} = 1.224$ | |
| $r_{12} = 1.561$ | | |
| | $d_{12} = 0.219$ | CaF$_2$ |
| $r_{13} = -2.216$ | | |
| | $d_{13} = 0.009$ | |
| $r_{14} = 1.215$ | | |
| | $d_{14} = 0.167$ | quartz |
| $r_{15} = 0.787$ | | |
| $f_I = 0.9, \quad f_{II} = 2.87$ | | |

| Embodiment 2 |
|---|
| $f = 1, \quad \beta = -20, \quad NA = 0.4$ |

| | | |
|---|---|---|
| | $d_0 = 0.052$ | |
| $r_1 = -0.281$ | | |
| | $d_1 = 0.121$ | quartz |
| $r_2 = 1.532$ | | |
| | $d_2 = 0.423$ | LiF |
| $r_3 = -0.327$ | | |
| | $d_3 = 0.019$ | |
| $r_4 = -1.58$ | | |
| | $d_4 = 0.114$ | quartz |
| $r_5 = 0.742$ | | |
| | $d_5 = 0.195$ | CaF$_2$ |
| $r_6 = -0.985$ | | |
| | $d_6 = 0.009$ | |
| $r_7 = 4.795$ | | |
| | $d_7 = 0.231$ | CaF$_2$ |
| $r_8 = -0.499$ | | |
| | $d_8 = 0.093$ | quartz |
| $r_9 = 0.792$ | | |
| | $d_9 = 0.341$ | LiF |
| $r_{10} = -1.634$ | | |
| | $d_{10} = 1.641$ | |
| $r_{11} = 8.381$ | | |
| | $d_{11} = 0.324$ | CaF$_2$ |
| $r_{12} = -1.656$ | | |
| | $d_{12} = 0.462$ | |
| $r_{13} = 1.192$ | | |

-continued

| Embodiment 2 |  |  |
|---|---|---|
| $f = 1$, $\beta = -20$, $NA = 0.4$ | | |
| | $d_{13} = 0.277$ | $CaF_2$ |
| $r_{14} = -18.791$ | | |
| | $d_{14} = 0.225$ | quartz |
| $r_{15} = 0.846$ | | |
| $f_I = 1.33$, $f_{II} = 3.41$ | | |

| Embodiment 3 |  |  |
|---|---|---|
| $f = 1$, $\beta = -20$, $NA = 0.4$ | | |
| | $d_0 = 0.058$ | |
| $r_1 = -0.267$ | | |
| | $d_1 = 0.116$ | quartz |
| $r_2 = 0.299$ | | |
| | $d_2 = 0.494$ | $CaF_2$ |
| $r_3 = -0.490$ | | |
| | $d_3 = 0.006$ | |
| $r_4 = 2.107$ | | |
| | $d_4 = 0.233$ | $CaF_2$ |
| $r_5 = -0.692$ | | |
| | $d_5 = 0.012$ | |
| $r_6 = -5.352$ | | |
| | $d_6 = 0.116$ | quartz |
| $r_7 = 0.528$ | | |
| | $d_7 = 0.442$ | $CaF_2$ |
| $r_8 = -0.489$ | | |
| | $d_8 = 0.116$ | quartz |
| $r_9 = -1.905$ | | |
| | $d_9 = 0.061$ | |
| $r_{10} = 1.233$ | | |
| | $d_{10} = 0.384$ | $CaF_2$ |
| $r_{11} = -0.599$ | | |
| | $d_{11} = 0.116$ | quartz |
| $r_{12} = 0.851$ | | |
| | $d_{12} = 1.566$ | |
| $r_{13} = 1.721$ | | |
| | $d_{13} = 0.291$ | $CaF_2$ |
| $r_{14} = -2.283$ | | |
| | $d_{14} = 0.012$ | |
| $r_{15} = 1.536$ | | |
| | $d_{15} = 0.221$ | quartz |
| $r_{16} = 0.884$ | | |
| $f_I = 0.77$, $f_{II} = 3.32$ | | |

| Embodiment 4 |  |  |
|---|---|---|
| $f = 1$, $\beta = -10$, $NA = 0.2$ | | |
| | $d_0 = 0.049$ | |
| $r_1 = -0.235$ | | |
| | $d_1 = 0.477$ | quartz |
| $r_2 = -0.511$ | | |
| | $d_2 = 0.007$ | |
| $r_3 = 8.339$ | | |
| | $d_3 = 0.488$ | $CaF_2$ |
| $r_4 = -0.603$ | | |
| | $d_4 = 0.007$ | |
| $r_5 = -3.479$ | | |
| | $d_5 = 0.07$ | quartz |
| $r_6 = 0.468$ | | |
| | $d_6 = 0.249$ | $CaF_2$ |
| $r_7 = -0.451$ | | |
| | $d_7 = 0.07$ | quartz |
| $r_8 = -6.42$ | | |
| | $d_8 = 0.035$ | |
| $r_9 = 2.84$ | | |
| | $d_9 = 0.21$ | $CaF_2$ |
| $r_{10} = -0.493$ | | |
| | $d_{10} = 0.07$ | quartz |
| $r_{11} = 48.894$ | | |
| | $d_{11} = 1.088$ | |
| $r_{12} = 1.696$ | | |
| | $d_{12} = 0.21$ | $CaF_2$ |
| $r_{13} = -1.963$ | | |
| | $d_{13} = 0.011$ | |

-continued

| Embodiment 4 |  |  |
|---|---|---|
| $f = 1$, $\beta = -10$, $NA = 0.2$ | | |
| $r_{14} = 0.962$ | | |
| | $d_{14} = 0.105$ | quartz |
| $r_{15} = 0.706$ | | |
| $f_I = 1.41$, $f_{II} = 2.69$ | | | wherein the reference symbols $r_1, r_2, \ldots$ represent the radii of curvature on the surfaces of the respective lens elements, and the reference symbols $d_1, d_2$, designate the thicknesses of the respective lens elements and the airspaces reserved therebetween.

Figure 2:
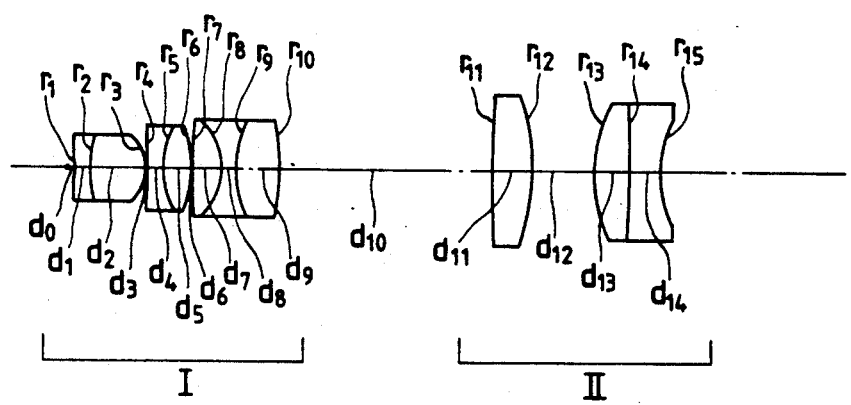
Figure 3:
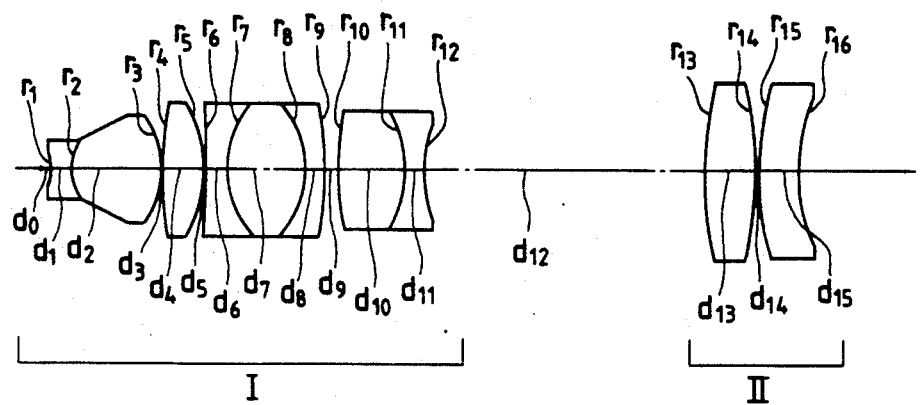
Figure 4:
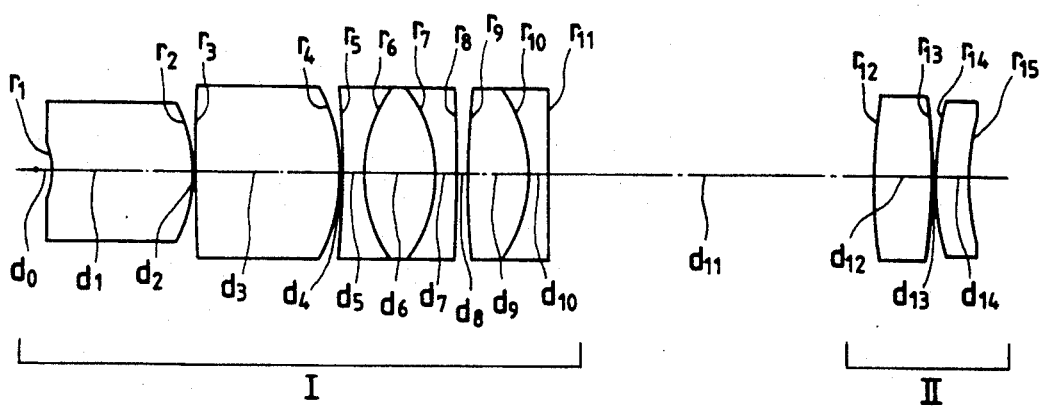
Figure 5:
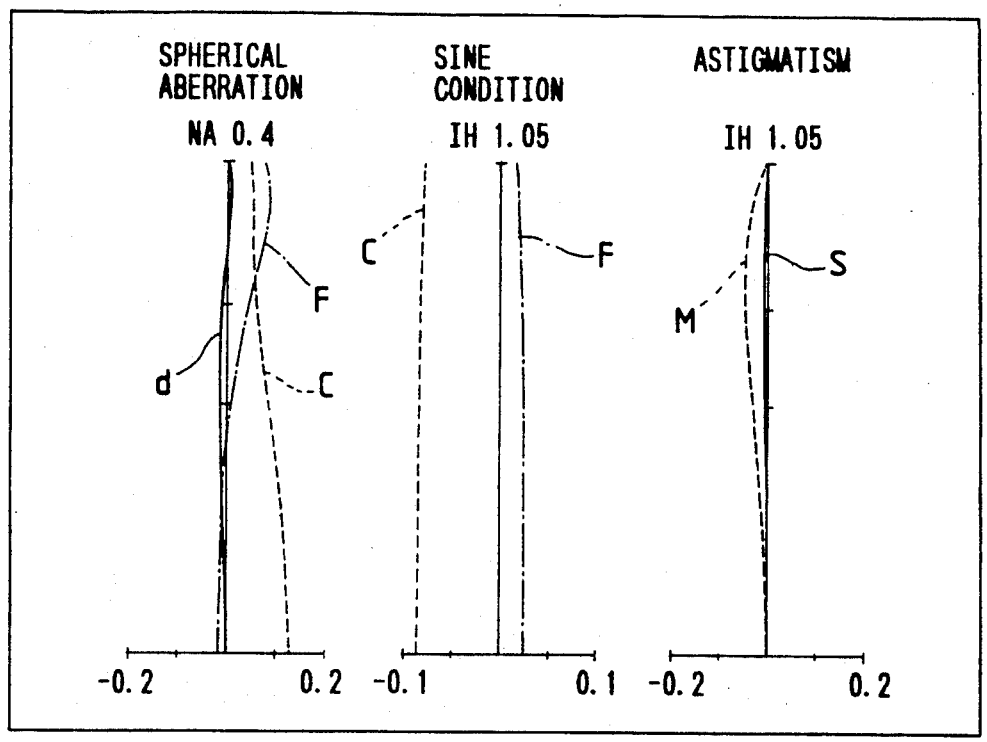
FIG. 5 through FIG. 8 show graphs illustrating aberration characteristics of the Embodiments 1 through 4 respectively.
Figure 6:
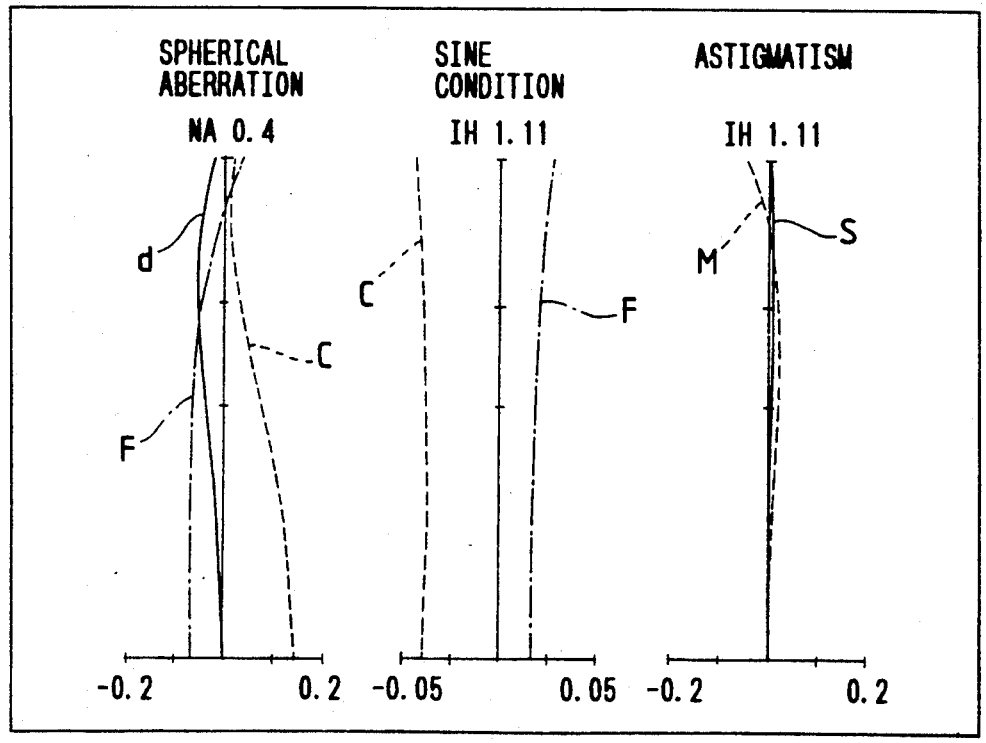
Figure 7:
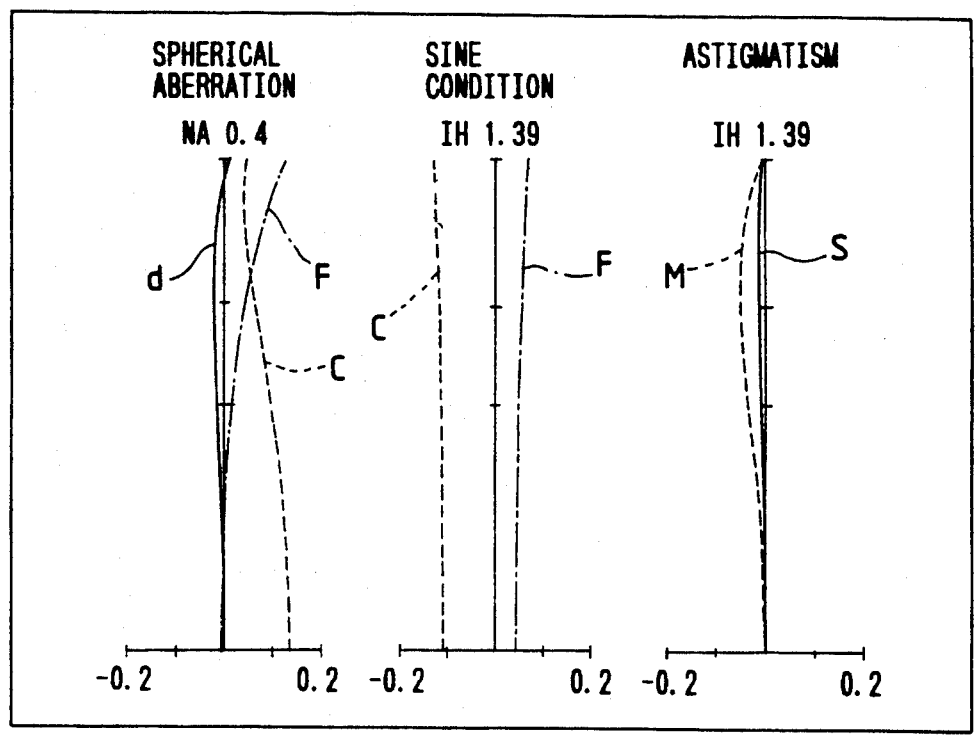
Figure 8:
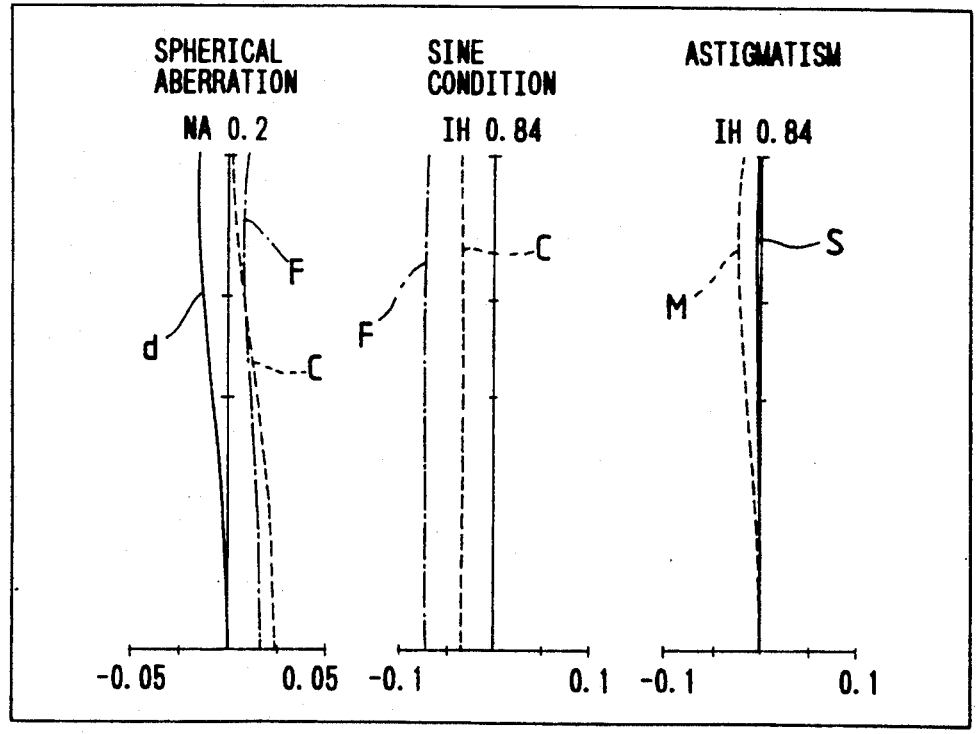

The Embodiments 1 through 4 have the compositions illustrated in FIG. 1 through 4 respectively and chromatic aberration corrected within a range of 250 nm±20 nm.

As is understood from the foregoing description, the objective lens system according to the present invention has aberrations corrected favorably even at the marginal portion of a wide visual field within a region of wavelengths shorter than 300 nm, and is suited for use as an objective lens system for ultraviolet rays.

We claim:

1. An objective lens system comprising in the order from the object side; a first lens unit having a positive refractive power, and comprising a meniscus lens component having a concave surface on the object side and plurality of cemented lens components; and a second, lens unit comprising a plurality of lens elements with optical materials composing all lens elements of said lens units having, when said materials are 5 mm thick, transmittance of at least 50% for a ray having a wavelength of 300 nm.

2. An objective lens system according to claim 1 wherein said cemented lens components arranged in said first lens unit are composed of positive lens elements and negative lens elements, and said positive lens elements are made of calcium fluoride or lithium fluoride, and said negative lens elements are made of quartz.

3. An objective lens system according to claim 1 or 2 designed so as to satisfy the following conditions (1) and (2):

$$0.7 < f_I/f < 1.5 \quad (1)$$

$$1.5 < f_{II}/f_I < 5.0 \quad (2)$$

wherein the reference symbols $f_I$ and $f_{II}$ represent the focal lengths of said first lens unit and said second lens unit respectively, and the reference symbol f designates the focal length of said objective lens system as a whole.

4. An objective lens system according to claim 3 wherein said first lens unit is designed so as to satisfy the following condition (3):

$$0.15 < |r_1|/f < 0.45 \quad (3)$$

wherein the reference symbol $r_1$ represents the radius of curvature on the object side surface of the lens component arranged on the most object side in said first lens unit.

5. An objective lens system according to claim 4 designed so as to satisfy the following condition (4):

$$0.5 < D/f \quad (4)$$

wherein the reference symbol D represents the airspace reserved between said first lens unit and said second lens unit.

* * * * *